United States Patent [19]
Bigham et al.

[11] 3,920,206
[45] Nov. 18, 1975

[54] NON-PENETRATING RIB-TO-SURFACE STRUCTURAL CLIP CONNECTOR ASSEMBLY

[75] Inventors: Carroll R. Bigham, Dunwoody; Ronald E. Barrie, Smyrna, both of Ga.

[73] Assignee: The United States of America as represented by the Secretary of the Air Force, Washington, D.C.

[22] Filed: Aug. 5, 1974

[21] Appl. No.: 494,934

[52] U.S. Cl. .................. 244/132; 52/483; 244/123
[51] Int. Cl.² ............................................. B64C 3/26
[58] Field of Search .......... 244/123, 124, 119, 117, 244/131, 132; 52/483

[56] References Cited
UNITED STATES PATENTS

| | | | |
|---|---|---|---|
| 2,230,393 | 2/1941 | Thomson | 244/123 X |
| 2,393,081 | 1/1946 | Watter | 244/124 |
| 2,441,858 | 5/1948 | Watter | 244/124 |
| 2,458,686 | 1/1949 | Davie | 244/123 |
| 3,185,267 | 5/1965 | Pavlecka | 52/483 X |

*Primary Examiner*—Trygve M. Blix
*Assistant Examiner*—Galen L. Barefoot
*Attorney, Agent, or Firm*—Joseph E. Rusz; Arsen Tashjian

[57] ABSTRACT

A connector assembly adapted for use in structurally forming an airfoil, without the use of skin surface penetrating fasteners to join the chordwise disposed ribs to the airfoil skin surface. The connector assembly includes: a plurality of ridges (or knobs) on the inner surface of the airfoil skin; a plurality of flanges (or surface stiffeners), also on the inner surface of the airfoil skin, and interposed between the ridges; and, a plurality of trihedral angle-like configurated clips, one each of which is snugly fitted or wedged between one of the flanges and the adjacent ridge. The connector assembly eliminates the present day necessity of penetrating the airfoil skin with holes and fasteners; and, thereby, eliminates or significantly reduces the stress concentration, and greatly improves the fatigue life, the weight, and the cost factors involved.

1 Claim, 1 Drawing Figure

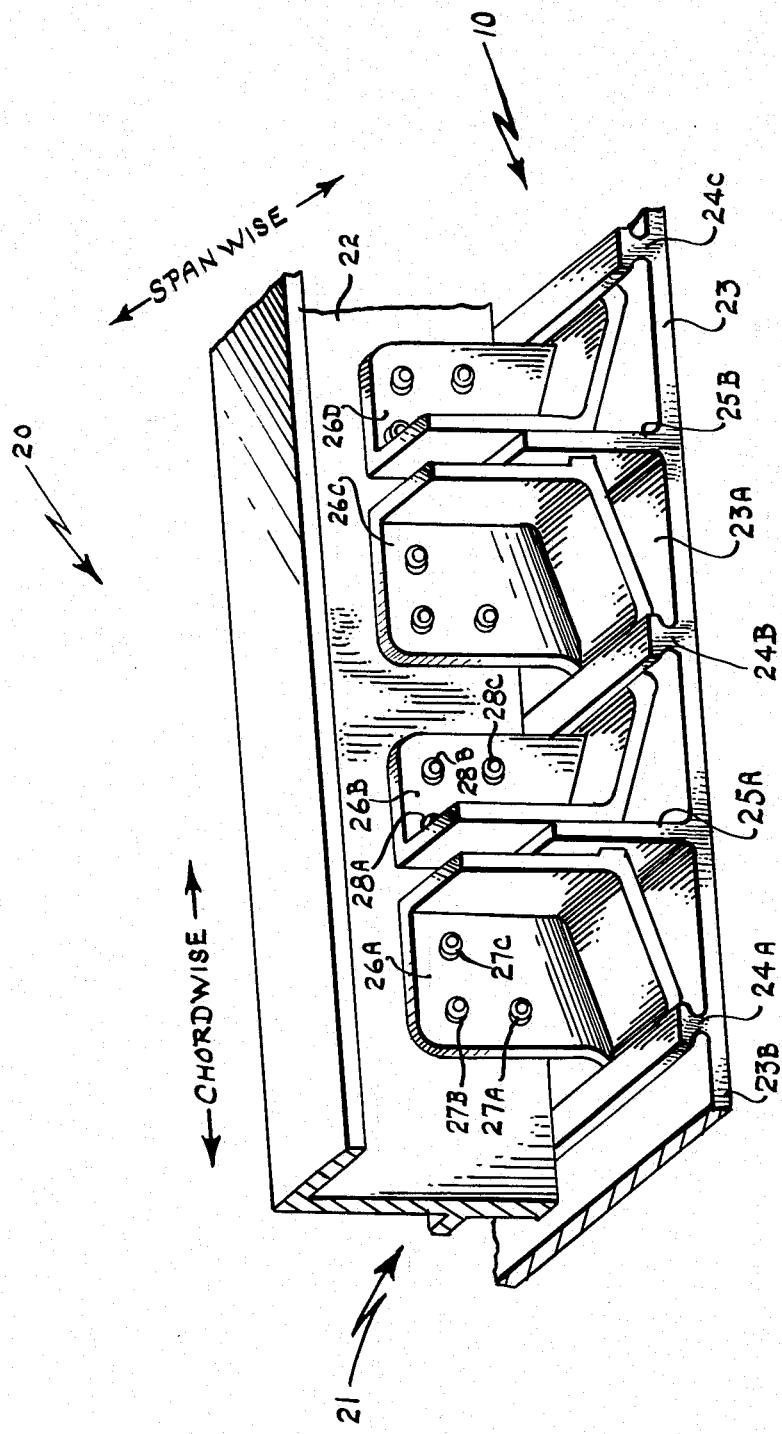

NON-PENETRATING RIB-TO-SURFACE STRUCTURAL CLIP CONNECTOR ASSEMBLY

BACKGROUND OF THE INVENTION

This invention relates to a unique connector assembly and, more particularly, to an adaptation thereof as a non-penetrating rib-to-skin structural connecting means for use in forming an airfoil.

To date a limiting factor of most airfoils, and more specifically of the wing box portion thereof, has been the use of mechanical fasteners for the spanwise joining of wing cover panels (i.e., the skin covering material). In this regard, it is to be noted that conventional wing box design depends upon and utilizes the fastening of clips to surfaces (i.e., the covering material) by mechanical fasteners which do, and presently must, penetrate the surface. The necessary penetration of the covering material with and by fastener holes causes stress concentrations which must be accounted for in the design airfoil by a reduction of allowable operating stress. Although bonding has a more favorable fatigue quality than penetrating mechanical fasteners, bonding has too low of a reliability to be used as an airfoil rib-to-surface (i.e., skin) joining means. Obviously, if the stress concentrations could be eliminated or significantly reduced, while at the same time the cost could be reduced by reducing the number of fasteners to be used, then the fatigue, the weight, and the cost factors could be greatly improved.

We have invented a connector assembly that effects a rib-to-surface (i.e., skin) structural tie between the rib and the surface structure, without the necessity of penetrating the surface with a structural fastener of any type. We have, therefore, significantly advanced the state-of-the-art.

SUMMARY OF THE INVENTION

Our invention pertains to a connector assembly which, in the form of an adaptation for use with an airfoil, permits rib-to-skin connection without the need of penetrating the skin.

Therefore, the principal object of this invention is to teach the structure of such a connector assembly.

Another object is to teach an adaptation thereof which is especially well suited for use with an airfoil and, more specifically, with the wing box portion thereof.

These objects, as well as other equally important and related objects (such as: reduced cost because of the elimination of certain drilling and riveting operations; reduced weight because our inventive connector assembly is lighter than the conventionally used clip-and-skin fastener structure; and, improved structural integrity because of the elimination of localized stress concentrations commonly associated with skin penetrating fasteners), will become readily apparent after a consideration of the description of the invention and reference to the drawing.

DESCRIPTION OF THE DRAWINGS

The drawing is a perspective view of a representative portion of our inventive connector assembly in simplified pictorial form, partially cross sectioned and partially fragmented.

DESCRIPTION OF THE PREFERRED EMBODIMENT

With reference to the drawing, the preferred embodiment 10 of the adaptation of our inventive connector assembly is shown in use in a wing prime box 21 which is a major component of an airfoil generally designated 20.

The airfoil 20, which of course includes the wing prime box 21, has chordwise and spanwise directions as shown by the legended arrows; and, it 20 also has a plurality of chordwise disposed ribs (not shown) of which the chordwise disposed rib 22, or more accurately the rib cap thereof, is a representative one; and, it 20 further has a surface or skin, such as portion 23 thereof, of suitable covering material which, in turn, has an inner surface, such as portion 23A thereof, and an outer surface, such as portion 23B thereof.

Our inventive connector assembly, as incorporated in the preferred embodiment 10 and in the formation of airfoil 20, comprises: a plurality of similar ridges (i.e., knobs), such as representative ones 24A, 24B, and 24C, which are disposed spanwise in, preferably, equally spaced relationship on the inner surface 23A of the airfoil 20; a plurality of similar flanges (i.e., surface stiffeners), such as representative ones 25A and 25B, with one of each of the flanges, such as representative one 25A, interposed between every two adjacent ridges, such as 24A and 24B for flange 25A and 24B and 24C for flange 25B, and with the flanges disposed spanwise in, preferably, equally spaced relationship on the inner surface 23A of the skin 23 of the airfoil 20; a plurality of similar clips, such as representative ones 26A, 26B, 26C, and 26D, that are so configurated (e.g., trihedral angle-like) and are so dimensioned that each clip, such as 26A, fits snugly (i.e., can be wedged) between one ridge, such as 24A, and an adjacent flange, such as 25A, and abuts with a chordwise disposed rib or rib cap, such as 22; and, means, such as representative fasteners 27A, 27B, 27C, 28A, 28B, and 28C, for attaching any of the plurality of similar trihedral angle-like configurated clips, such as representative ones 26A and 26B, to a chordwise disposed rib or rib cap, such as 22.

MANNER OF OPERATION OF THE PREFERRED EMBODIMENT

The structure of, and manner of operation of, our unique connector assembly, as adapted for use in forming an airfoil, is self-evident and is very easily understood from the herein contained description of the preferred embodiment 10, coupled with reference to the drawing.

Suffice it to say that even a cursory examination of the drawing incontestably establishes that our connector assembly eliminates the use of, and need for, any fasteners to accomplish the joining of the skin covering material 23 of the airfoil 20 to the rib or rib cap 22.

CONCLUSION

It is abundantly clear from all of the foregoing, and from the drawing herein, that the stated and desired principal object of our invention has been attained. In addition, related desirable objects also have been achieved.

It is to be noted that, although there have been described the fundamental and unique features of my invention as applied to a particular preferred embodiment, various other embodiments, substitutions, additions, omissions, adaptations, and the like, will occur to, and can be made by, those of ordinary skill in the art, without departing from the spirit of our invention.

What is claimed is:

1. A connector assembly, adapted as a non-penetrating rib-to-skin structural clip connecting means for use in forming an airfoil which has chordwise and spanwise directions, at least one rib disposed chordwise, and a skin of suitable covering material having an inner surface and an outer surface, comprising:
   a. a plurality of similar ridges disposed spanwise in equally spaced relationship on the inner surface of the skin of the airfoil;
   b. a plurality of similar flanges, with one of each of said plurality of flanges interposed between every two adjacent ridges of said plurality of ridges, and with said flanges disposed spanwise in equally spaced relationship on the inner surface of the skin of the airfoil;
   c. a plurality of similar clips that are trihedral angle-like configurated and are so dimensioned that each clip fits snugly between one ridge and an adjacent flange, and abuts with a chordwise disposed rib;
   d. and, fasteners for attaching any of the said plurality of similar clips to a chordwise disposed rib.

* * * * *